March 4, 1930.  W. L. EGLINTON  1,749,243
ROAD MAP EXHIBITING APPARATUS FOR MOTOR VEHICLES
Filed Feb. 27, 1928  2 Sheets-Sheet 1
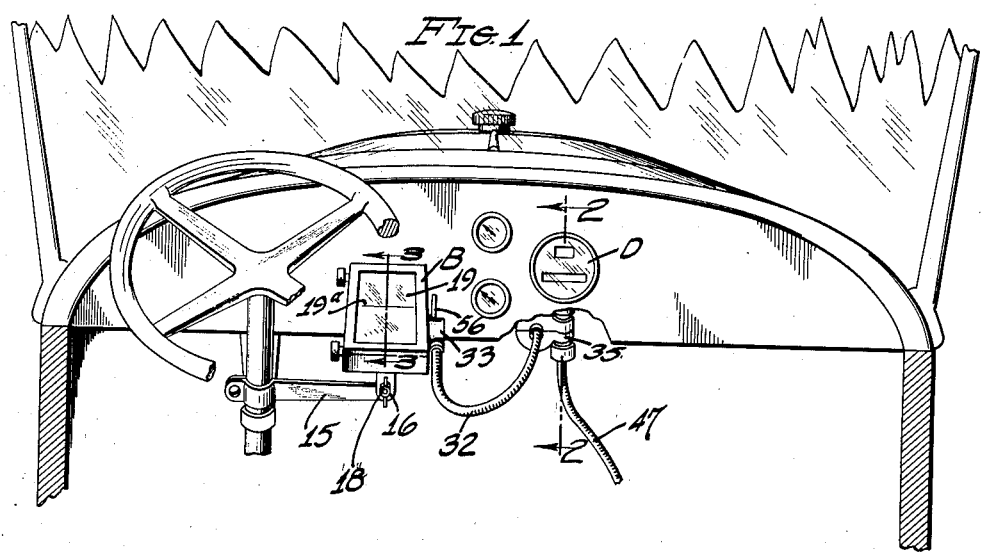
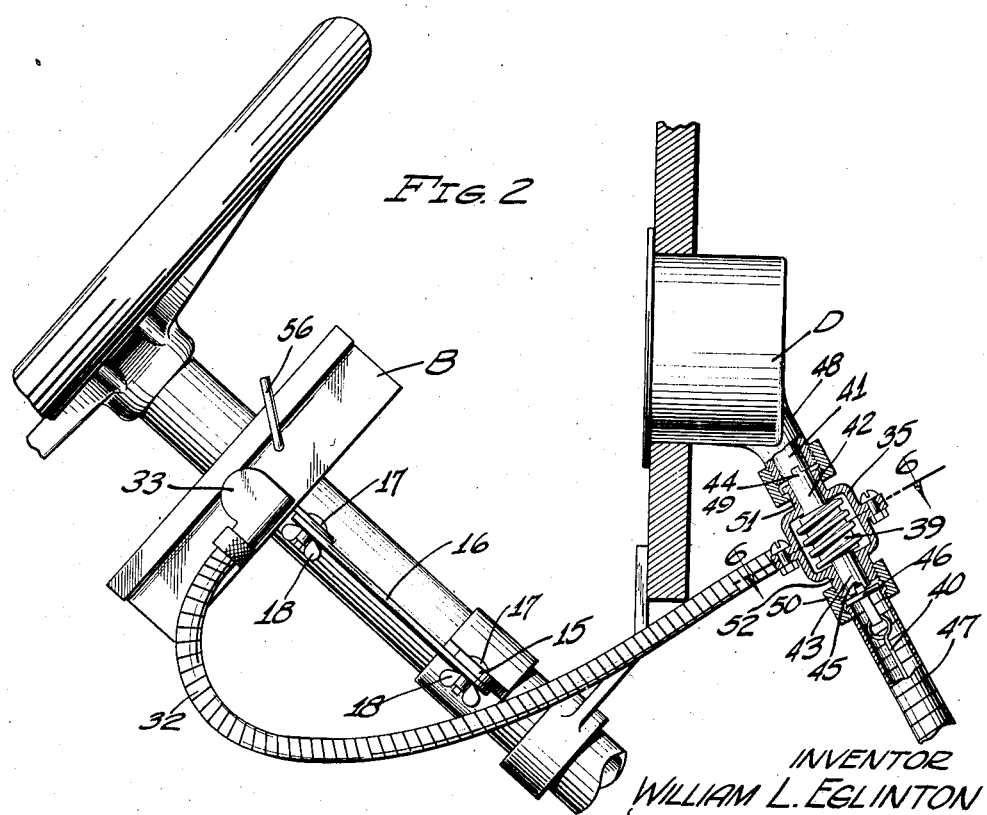
INVENTOR
WILLIAM L. EGLINTON
BY Munn & Co
ATTORNEY

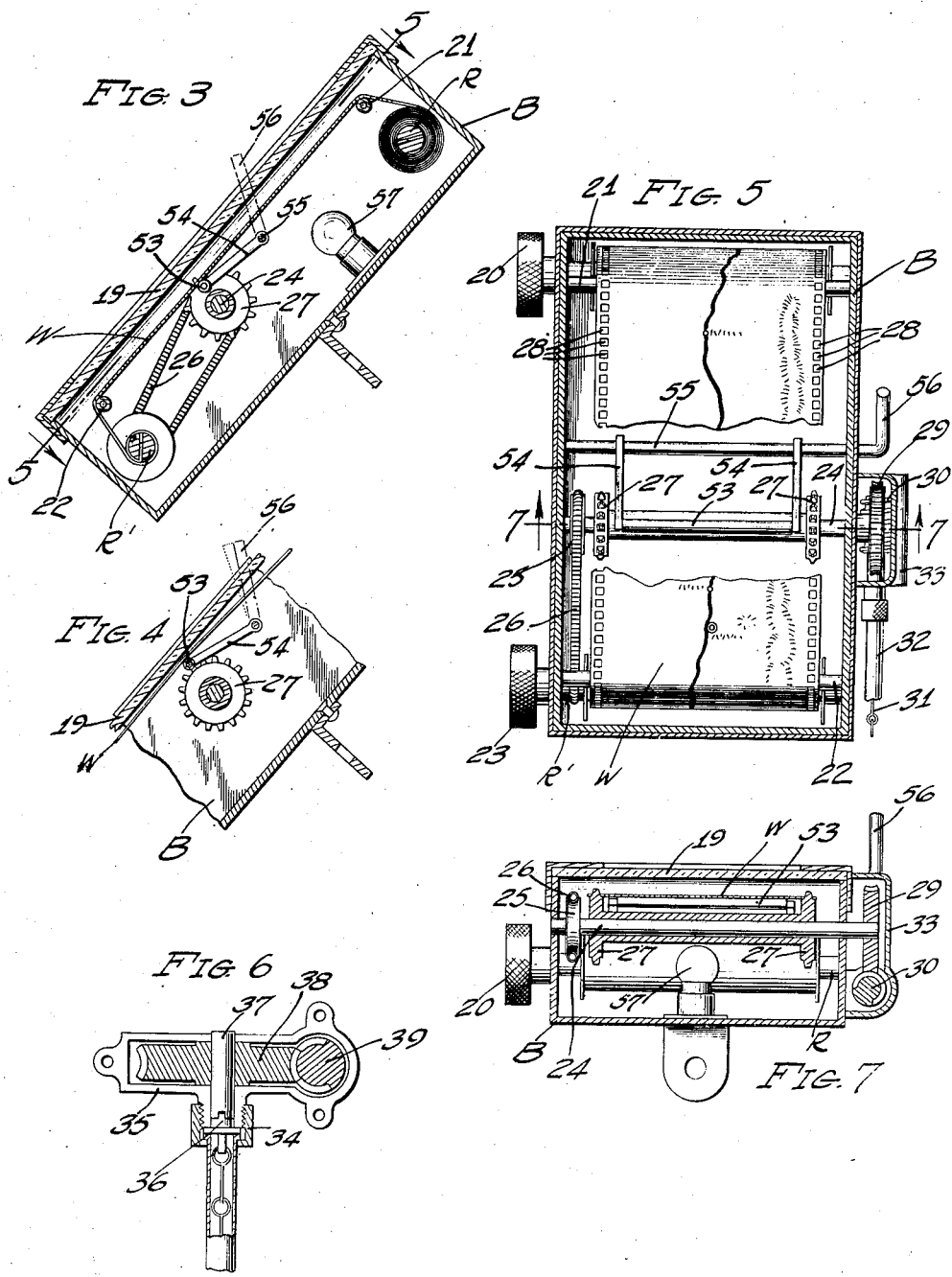

Patented Mar. 4, 1930

1,749,243

UNITED STATES PATENT OFFICE

WILLIAM L. EGLINTON, OF GLENDALE, CALIFORNIA

ROAD-MAP-EXHIBITING APPARATUS FOR MOTOR VEHICLES

Application filed February 27, 1928. Serial No. 257,311.

My invention relates to and has for its purpose the provision of a simple, comparatively inexpensive, and practical apparatus capable of ready application to an automobile which embodies a road map that is operable by the forward movement of the vehicle to be successively exhibited and in a manner to continuously indicate to the motorist his precise geographical location and to thereby greatly facilitate touring.

I will describe only one form of road map exhibiting apparatus for automobiles embodying my invention and will then point out the novel features in claims.

In the accompanying drawings:

Fig. 1 is a view showing in front elevation one form of road map exhibiting apparatus embodying my invention in applied position to a motor vehicle, the latter being shown in fragmentary vertical section;

Fig. 2 is an enlarged vertical sectional view taken on the line 2—2 of Fig. 1;

Fig. 3 is an enlarged sectional view taken on the line 3—3 of Fig. 1;

Fig. 4 is a fragmentary view similar to Fig. 3 illustrating the active position of the map web releasing device;

Fig. 5 is a sectional view taken on the line 5—5 of Fig. 3;

Fig. 6 is a sectional view taken on the line 6—6 of Fig. 2; and

Fig. 7 is a transverse sectional view taken on the line 7—7 of Fig. 5.

Similar reference characters refer to similar parts in each of the several views.

My invention in its present embodiment comprises a box or casing B adapted to be supported within view of the operator of the vehicle upon a bracket 15, shown in the present instance as clamped to the steering column of the vehicle and provided with an arm 16 pivotally connected to the box B and to the bracket 15 by bolts 17 carrying winged nuts 18, and by means of which the arm 16 is adjustable on the bracket 15 and the box adjustable on the arm 16, all in a manner to permit positioning of the box as desired to be clearly viewed by the operator.

The box is provided with a transparent top 19 formed of glass or other suitable material, and beneath which is a web W of suitable material having on its exposed surface a road map as clearly illustrated in Fig. 5. Normally the web W is wound about a reel R journaled in the box and having one end provided with a knurled handle 20 by which the reel can be manually rotated. From the reel R the web is extended over a roller 21 (Fig. 3) and from the latter downwardly and around the second roller 22 at the lower end of the box, so that that portion of the web between the rollers 21 and 22 is supported in parallel relation to the transparent top 19. From the roller 22 the map is adapted to be wound about a reel R' and likewise journaled in the box and provided with a knurled handle 23 by which the reel can be manually rotated. A shaft 24 is journaled in the box between the reels R and R', and this shaft is provided with a groove pulley 25 (Fig. 5) about which is trained a spring belt 26. This belt is also trained about the reel R' thus providing a driving connection between the shaft 24 and the reel R'. With the shaft 24 positively driven in the proper direction, it will be apparent that the reel R' is rotated to cause winding of the web W onto the reel R', although this driving means is not relied upon solely to actuate the map web, but is primarily designed to produce proper rotation of the reel R' to maintain that portion of the web between the reels R and R' relatively taut so that it will be properly exhibited through the transparent top 19.

The actual feeding of the web W from the reel R downwardly onto the reel R' is effected through the provision of a pair of sprocket wheels 27 fixed to the shaft 24 and having the teeth thereof meshing within openings 28 in the marginal edges of the web W. The shaft 24 is adapted to be driven by a mechanism which is capable of ready application to the flexible shaft of an odometer. This mechanism in the present instance comprises a worm wheel 29 fixed to the shaft 24 at a point exteriorly of the box B and constantly meshing with a worm 30 on the end of a flexible shaft 31 contained in a flexible conduit 32. A housing 33 encloses the gears 29 and 30 and provides a support for one end of the conduit 32. The opposite end of the conduit is connected by an interiorly threaded sleeve 34 to a gear housing 35 (Figs. 2 and 6), and the flexible shaft 31 is provided with a tongued head 36 engaging within the grooved end of a stub shaft 37 journaled in the housing and having fixed thereto a worm wheel 38. The worm wheel constantly meshes with a worm 39 which is interposed between the flexible driving shaft 40 and a rigid shaft 41 of an odometer D. As clearly shown in Fig. 2, the opposite ends of the worm 39 are provided with stub shafts 42 and 43, respectively, formed respectively with a tongue 44 and a groove 45. The tongue 44 fits within the groove end of the rigid shaft 41, while the groove 45 receives the tongued head 46 of the flexible shaft 40, thereby providing a driving connection between the flexible and rigid shafts and by means of which the worm 39 is actuated. The construction of the housing 35 is such as to permit of its connection to the conduit 47 of the shaft 40 and the conduit 48 of the shaft 41, threaded sleeves 49 and 50 being provided for the purpose. The housing 35 is made up of two sections bolted together, and each section is provided with tubular extensions 51 and 52, the extension 51 being flanged at its outer end and receiving the sleeve 49, while the extension 52 is exteriorly threaded to receive the sleeve 50.

The odometer is, of course, of conventional form, and the flexible shaft 40 with its conduit 47 is likewise conventional and is connected to the drive shaft of the motor or to one of the front wheels of the vehicle by which the odometer is operated in the usual manner to indicate the distance traveled by the vehicle.

In the operation of the apparatus a particular web W having thereon the desired road map is applied to the reels R and R', and with the shaft 24 operatively connected to the flexible shaft 40, it will be clear that the shafts 24 will be driven to feed the web W from the reel R onto the reel R', the spring belt 26 actuating the reel R' in a manner to produce the proper winding of the web on the reel and to maintain the exposed portion thereof relatively taut as has been described. The mechanism for actuating the web is so designed that in its association with the shaft 40 the rate of feeding of the web is such in relation to the forward movement of the vehicle as to cause the proper exhibiting of the map to continuously indicate to the operator his geographical location. Thus, the operator is at all times apprised of his location, and by imprinting on the web facts and information relating to the character of the road and certain landmarks, the possibility of deviating from the prescribed course is precluded and motoring otherwise greatly facilitated.

Should it be desired, for any reason, to adjust the web W so as to expose any desired portion of the map thereon, or to rewind the web on the reel R, the web can be thrown out of engagement with the sprocket wheels 27 by the provision of a roller 53 mounted on arms 54, the latter being secured to a shaft 55 journaled in the box and having one end bent to provide a handle 56 by which the shaft can be rotated to elevate the roller from the position shown in Fig. 3 to that shown in Fig. 4, and in which latter position the web is elevated free of the teeth of the sprocket wheels 27. By holding the roller 53 in this position the web can be freely moved, as will be understood.

In order to aid the operator in following the course prescribed by the map on the web, the transparent top 19 has a line 19$^a$ inscribed thereon extending transversely of the medial portion of the box as shown in Fig. 1. An electric lamp 57 may be placed within the box B so as to illuminate the map at night so that it will be clearly exhibited to the operator.

Although I have herein shown and described only one form of road map exhibiting apparatus for automobiles embodying my invention, it is to be understood that various changes and modifications may be made herein without departing from the spirit of the invention and the spirit and scope of the appended claims.

I claim:

1. An apparatus of the character described comprising a pair of reels, a map web trained about the reels, means for feeding the web from one reel to the other, and means for moving the web free of said feeding means to permit manual rotation of either reel to effect any desired adjustment of the map web.

2. An apparatus of the character described comprising a pair of reels, a map web connected to and trained about the reels and having openings in the marginal edges thereof, a shaft between the reels, sprocket wheels on the shaft having the teeth thereof engaging within said openings, means for driving the shaft whereby the sprocket wheels operate to feed the map web from one reel to the other, and means for moving the map web free of the sprocket wheels to permit manual adjustment of the map web by means of the reels.

3. An apparatus of the character described comprising a pair of reels, a map web connected to and trained about the reels and having openings in the marginal edges thereof, a shaft between the reels, sprocket wheels on the shaft having the teeth thereof engaging within said openings, means for driving the shaft whereby the sprocket wheels operate to feed the map web from one reel to the other, and means for moving the map web free of the sprocket wheels to permit manual adjustment of the map web by means of the reels comprising a roller adapted to engage the map web, arms on the roller, a shaft to which the arms are fixed, and a handle for rotating the shaft whereby the roller is moved to elevate the web free of the sprocket wheels.

4. An apparatus of the character described comprising a pair of reels, a map web trained about the reels, means engaging the web for feeding the latter from one reel to the other, and means for disengaging the web and feeding means to render the reels capable of manual rotation to effect any desired adjustment of the web.

5. An apparatus of the character described comprising a pair of reels, a map web trained about the reels, means providing a driving connection of the web directly therewith for feeding the web from one reel to the other, and means for disconnecting the web and last means to render the reels capable of manual rotation to effect any desired adjustment of the web.

Signed at Los Angeles in the county of Los Angeles and State of California this 9th day of February, A. D. 1928.

WILLIAM L. EGLINTON.